July 2, 1957    H. A. BAUERMEISTER ET AL    2,797,440
DEVICE FOR HEATING OF MOLDED BODIES, ESPECIALLY TIRES, IN AN
ELECTRIC HIGH-FREQUENCY ALTERNATING FIELD
Filed April 30, 1954
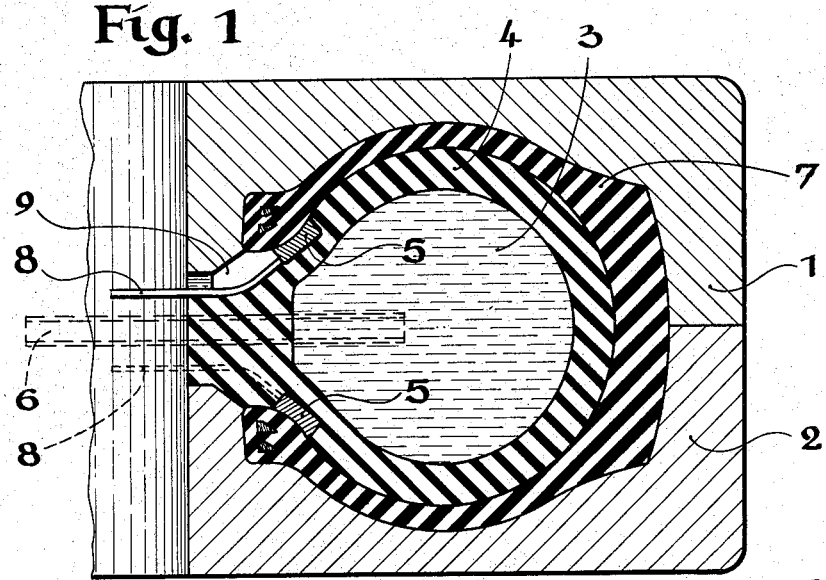
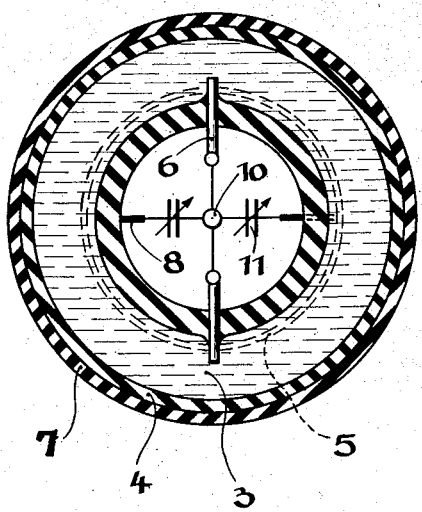
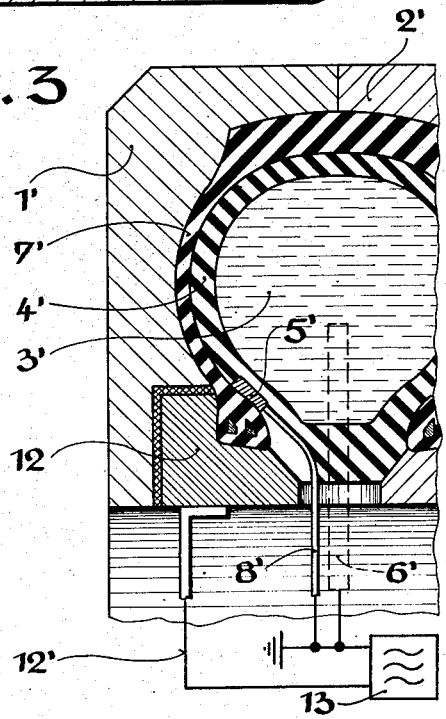
INVENTORS:
Heinrich A. Bauermeister,
and
Hans-Dieter Krug

United States Patent Office 2,797,440
Patented July 2, 1957

2,797,440

DEVICE FOR HEATING OF MOLDED BODIES, ESPECIALLY TIRES, IN AN ELECTRIC HIGH-FREQUENCY ALTERNATING FIELD

Heinrich A. Bauermeister and Hans-Dieter Krug, Hannover, Germany, assignors to Continental Gummi-Werke Aktiengesellschaft, Hannover, Germany Application April 30, 1954, Serial No. 426,801

Claims priority, application Germany May 2, 1953

2 Claims. (Cl. 18—38)

The present invention relates to the preheating or vulcanization of pneumatic tires in an electric high-frequency alternating field.

When heating molded bodies such as pneumatic tires, which do not have a uniform wall thickness or which consist of material with different dielectric coefficients, great difficulties are encountered when heating such bodies in an electric high-frequency alternating field, to heat the thickest portion of the molded body to the same extent and within the same period of time as the remaining portions of the molded body. By materials of different dielectric coefficient are meant materials which when heated in a high-frequency electric alternating field (wave length approximately 5 to 100 meters) reach different temperature risings. As is well known, the heating of a body in a high-frequency alternating field varies primarily in conformity with the dielectric coefficient $\epsilon$ and the ion angle tan $\delta$ of said alternating field (the heating up is directly proportional to the product of $\epsilon \tan \delta$).

It is, therefore, an object of the present invention to provide an arrangement which will overcome the above mentioned drawbacks.

It is another object of this invention to provide a simple and easily effective arrangement which will make it possible to heat those portions of a pneumatic tire which are thicker or comprise greater accumulations of material than other portions of a tire to the same extent and within the same period of time required for the heating of said other portions.

These and other objects and advantages of the invention will appear more clearly from the following specification in connection with the accompanying drawings in which:

Fig. 1 illustrates a radial partial section through a vulcanizing device according to the invention for vulcanizing pneumatic tires.

Fig. 2 represents a simplified top view of the device according to Fig. 1 which also illustrates the electric connections for the electrodes.

Fig. 3 illustrates an arrangement of the electrodes for heating the bead portions of a tire.

General arrangement

The above outlined and heretofore encountered difficulties when heating a pneumatic tire in a high-frequency alternating field have been overcome according to the present invention by arranging additional electrodes at those points of the tire where accumulations of material occur or where the layers making up the tire have a different dielectric coefficient. More specifically, according to one embodiment of the present invention one of the electrodes for heating up the tire has associated therewith a plurality of counterelectrodes, preferably such with different sizes of the plates. In this connection the voltages of the counterelectrodes may be different with regard to the voltage for the common electrode. This may be obtained by voltage dividers for instance by means of variable or fixed condensers arranged in series with electrodes having smaller plate sizes, provided that the voltage of the smaller counter-electrodes is to be reduced or varied at all.

This arrangement according to the present invention makes it possible to distribute the counter-electrodes as to space, i. e. to select such a position for the additional electrodes that the desired uniform heating of the body will be obtained for all cross sections of the body to be heated due to the possibility of directing and controlling the heat energy. The invention can advantageously be applied with all bodies having a non-uniform wall thickness, i. e. also with such bodies which have accumulations of material at one or more portions thereof. When selecting and arranging the additional electrodes, simultaneously the different composition of the individual layers can be taken into consideration. On the other hand, it is also possible in view of the above mentioned design of the electrodes to neglect sections or portions of the molded body or to convey thereto an increased quantity of heat if this should be desirable in certain instances.

While the invention is not specifically limited to pneumatic tires, it is of particular advantage in connection with the heating or vulcanization of pneumatic tires because such tires comprise considerable differences in the thickness of their walls and layers which when subjected to heating in a high-frequency electric alternating field behave different from the rubber cover layer of the tire. In this connection the bead portion of the tire may be particularly mentioned upon which the desired temperature rise may be imparted by an additional electrode in conformity with the invention whch additional electrode is arranged in an insulated manner with regard to the other electrode usually formed by a liquid which is electrically conductive and is contained within the unfinished tire.

When practically applying the invention, the additional electrode is preferably formed by a liner or coat on the heating hose or by an electrically conductive rubber layer on said hose. This manner of forming the counter-electrode has the advantage that the heating hose which is placed into the mold together with the unfinished tire is fixed to the additional electrode. In such an instance it would be merely necessary electrically to connect the additional counter-electrode with the current supply wires. In this connectionit will be appreciated that it is necessary anyhow to connect the electrically conductive filling of the heating hose with the electric current supply means.

According to a further development of the invention, a circumferential groove may be provided at a desired portion of the heating hose into which groove a metallic conductor of circular shape is introduced by elastically deforming the heating hose. In order to facilitate the introduction of the annular conductor into the inserted heating hose, it is advantageous to provide the annular conductor with slits so that it can be passed through portions of the heating hose or tire which are smaller in diameter than said annular conductor.

When employing additional electrodes which are detachably or non-detachably mounted in or on the heating hose, the current supply is effected by connections which are insulated and offset with regard to the current supply points for the electrically conductive liquid filling of the heating hose.

The employment of additional or auxiliary electrodes according to the present invention in connection with the preheating of pneumatic tires yields further important advantages as will presently appear. Thus, a reduction in the heating time required for pneumatic tires can be obtained by first heating only the bead portions of the tires by the lost dielectric heat whereupon all cross sections of the tires may in the customary manner be subjected to a further heat treatment. The heretofore customary steam heated vulcanizing devices for pneumatic tires can be used without reconstruction or alterations if the heating of the bead portions of the tire by dielectric lost heat is effected in a separate mold in which simultaneously also a pre-pressing of the bead portions of the tire may be effected.

*Structural arrangement*

Referring now to the drawing, and Fig. 1 thereof in particular, the outside electrode is formed by the mold portions 1 and 2, whereas the inwardly located counter-electrodes are formed by an electrically conductive filling 3 of the heating hose 4 and by additional or auxiliary electrodes 5 which are effective within the range of the bead portions of the tire. The filling 3 is passed through connections or studs 6 which are arranged at opposite portions of the heating hose 4, said studs or connections simultaneously serving as electrode connection for the filling 3. The tire to be heated and vulvanized is designated with the reference numeral 7.

The electrodes 5 illustrated in the drawing consist of annular metallic conductors having a slit portion which conductors are slipped between the bead portion and the heating hose 4 after the heating hose 4 has been inserted into the tire 7. To this end, the heating hose 4 is provided with annular depressions corresponding to the shape of the electrodes 5. The electrodes 5 are provided with terminals 8 for supplying electric energy thereto. The terminals may be designed as insulated cables which in the manner of a flag are connected with the annular conductors or electrodes 5. In order to facilitate the assembly of the connections or terminals 8, the heating hose 4 may be provided with radially arranged channels 9 into which the terminals or connections 8 are placed so as to thereby obtain sufficient insulation between the outer electrode 1, 2 and the connections 8.

The electric connection of the studs 6 and of the connections 8 will best be seen from Fig. 2. The supply conduit common to the electrodes 3 and 5 is designated with the reference numeral 10. The common conduit 10 has electrically connected thereto the electrically conductive connection 6 and furthermore connections to the variable condensers 11 by means of which the effective high-frequency voltage between the electrodes 5 and 1 and between the electrodes 5 and 2 may be controlled.

The vulcanizing device illustrated in Fig. 3 has a structure which is basically similar to that described in connection with Fig. 1 with the difference that the elements 1, 2 and 3 are not used as electrodes. The preheating of the bead portions is effected by the auxiliary electrodes 5' the counter-electrodes of which are formed by annular portions 12 which are electrically insulated with regard to the elements 1' and 2' of the mold so that no loss in energy will occur through the grounded mold portions 1' and 2'. The heating hose is designated with the reference numeral 4'.

A simplified circuit will be obtained when the connections 8' of the auxiliary electrodes 5' are grounded together with the connection 6' for the filling 3' of the heating hose. The operator will not be endangered by such a circuit, because the parts 12 of the mold which are under voltage are not accessible from the outside when the mold is closed. The arrangement of the electrodes 5' and 12 merely serves for preheating the beads of the tire 7'. After the bead portions have been preheated to the desired extent, the electric connection between the terminals 8' and 12' and the high-frequency generator 13 may be interrupted, whereupon all tire cross sections may be heated in the heretofore customary manner, e. g. by steam.

As has been mentioned above, also the preheating and if desired the pre-pressing of the bead portions may be effected in a separate mold. This mold can be of simple structure since it is merely used in connection with the bead portions. After the tire 7, 7' has been heat treated in such separate mold, it may in the customary manner be introduced into the vulcanizing mold. The preheating of the bead portions is preferably effected to such an extent that when further treating the tire in the other mold it can be considered as a homogeneous body with uniform wall thickness.

It is to be understood that the arrangement shown in Fig. 3 is naturally provided with heating channels in the mold portions. However, since the provision of such channels is known and does not form a part of the present invention, these heating channels have been omitted in order not unnecessarily to load Fig. 3 with details which are not necessary for the understanding of the present invention.

It is, furthermore, to be understood that the present invention is not limited to the particular construction shown in the drawing but also comprises any modifications within the scope of the appended claims.

What we claim is:

1. A device for preheating and vulcanizing tires in an electric high-frequency alternating field which comprises in combination: a mold designed to receive a tire, at least a portion of said mold being arranged for connection with a high-frequency electric source to serve as first electrode, a liquid-filled curing bag arranged within said mold in spaced relationship thereto so as to allow inserton of a tire between said mold and said curing bag, electric conducting means arranged for connecting the liquid in said curing bag with said high-frequency electric source to cause said liquid to act as second electrode, said curing bag being provided with an annular groove located at a portion which when a tire is inserted between said curing bag and said mold is adjacent the bead portions of said tire, and metallic conductor means mounted in and selectively removable from said annular groove and arranged for connection with said high-frequency source.

2. A device for preheating and vulcanizing tires in an electric high-frequency alternating field, which comprises in combination: a mold designed to receive a tire, at least a portion of said mold being arranged for connection with a high-frequency electric source to serve as first electrode, a curing bag arranged within said mold in spaced relationship thereto so as to allow insertion of a tire between said mold and said curing bag, means carried by said curing bag and serving as second electrode, said curing bag being provided with an annular groove located at a portion which when a tire is inserted between said curing bag and said mold is adjacent the bead portions of said tire, and an annular slit metallic conductor detachably mounted in said annular groove for use as additional electrode in connection with said high-frequency source.

References Cited in the file of this patent

UNITED STATES PATENTS

| | | |
|---|---|---|
| 2,280,771 | Dufour et al. | Apr. 28, 1942 |
| 2,298,037 | Crandell | Oct. 6, 1942 |
| 2,438,952 | Grotenhuis | Apr. 6, 1948 |
| 2,445,701 | Vogt | July 20, 1948 |
| 2,451,992 | Grotenhuis | Oct. 19, 1948 |
| 2,458,684 | Crandell | Jan. 11, 1949 |
| 2,626,428 | Bosomworth | Jan. 27, 1953 |